United States Patent
Creamer et al.

(10) Patent No.: US 7,209,264 B2
(45) Date of Patent: Apr. 24, 2007

(54) PRE-CONNECTION TELEPHONY DATA SIGNAL EXCHANGES

(75) Inventors: Thomas E. Creamer, Boca Raton, FL (US); Peeyush Jaiswal, Boca Raton, FL (US); Neil A. Katz, Parkland, FL (US); Victor S. Moore, Boynton Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1029 days.

(21) Appl. No.: 10/325,121

(22) Filed: Dec. 20, 2002

(65) Prior Publication Data

US 2004/0120015 A1    Jun. 24, 2004

(51) Int. Cl.
*H04N 1/00* (2006.01)
*H04M 11/00* (2006.01)

(52) U.S. Cl. .................. 358/434; 358/436; 379/100.17

(58) Field of Classification Search ................ 358/434, 358/435, 436, 437, 438, 439, 468, 469, 400, 358/405, 407, 409, 411; 379/100.06, 100.17, 379/93.01, 88.22, 106.01; 455/410, 466
See application file for complete search history.

(56) References Cited

U.S. PATENT DOCUMENTS

| | | | | |
|---|---|---|---|---|
| 5,396,342 A | * | 3/1995 | Meyer | 358/406 |
| 5,517,556 A | * | 5/1996 | Pounds et al. | 379/88.25 |
| 6,317,224 B1 | | 11/2001 | Lutgen et al. | 358/412 |
| 6,327,053 B1 | | 12/2001 | Meng | 358/434 |
| 2001/0053001 A1 | | 12/2001 | Numata | 358/468 |
| 2002/0015415 A1 | * | 2/2002 | Sugino et al. | 370/465 |
| 2006/0153108 A1 | * | 7/2006 | Nakajima | 370/286 |

* cited by examiner

*Primary Examiner*—Dov Popovici
(74) *Attorney, Agent, or Firm*—Akerman Senterfitt

(57) ABSTRACT

A method for conveying digital information can include initiating a telephone connection to a receiving device. Prior to establishing a voice channel connection with the receiving device, supplemental data can be digitally encoded into a CNG transmission. The CNG transmission can be conveyed via a CNG channel, wherein the CNG channel is capable of transporting a facsimile calling tone signal.

22 Claims, 2 Drawing Sheets

PRE-CONNECTION TELEPHONY DATA SIGNAL EXCHANGES

BACKGROUND OF THE INVENTION

1. Technical Field

The present invention relates to the field of telecommunications and, more particularly, to pre-connection telecommunication activities.

2. Description of the Related Art

Before a calling telephony device can call a receiving telephony device, a number of pre-connection activities can occur. In one such pre-connection activity, a calling device can signify that a facsimile (fax) message, as opposed to a voice communication, is being sent to the receiving device. Whenever this receiving device is capable of accepting the fax message, the receiving device may initialize a fax connection instead of generating a ringing sound (to indicate that a receiving party is being called). Since receiving parties often have a telephone receiver and a fax machine connected to the same telephone line, some mechanism providing a means for a receiving device to differentiate between attempted voice communications and incoming fax communications can be beneficial.

One incoming call identification method has been specified within the T.30 and T.4 protocols, which are predominantly utilized and recommended by the International Telecommunications Union (ITU). According to these protocols, an originating device can indicate a fax call with a fax calling tone (CNG), which is a short periodic tone that begins immediately after a phone number is dialed. This tone, also called a FAX CNG signal, is specified as an 1,100 Hz signal continuing for 0.5 seconds and repeated every 3 seconds. Consequently, telephony networks generally allow for the conveyance of a FAX CNG signal from a calling device to a receiving device at any point before the establishment of a connection.

Telephony companies (using circuit-switched technology) reserve a specified amount of bandwidth between an originating device and a receiving device for the duration of a telephone connection. The bandwidth normally reserved for one telephone voice channel (DSO) can accommodate a transmission rate of 64 kbps. This reserved bandwidth allows both the originating device and the receiving device to convey voice band (0–3,400 Hz) signals to one another.

While pre-connection signaling also occurs within the voice band (0–3,400 Hz), the entire frequency range of the voice band may not be available until after a connection is established. For example, filters are typically placed within telephony networks which prevent selected frequencies from propagating through the network. Such filters, however, do allow FAX CNG signals to pass. Hence, a segment of the voice band including the 1,100 Hz frequency is available for pre-connection signaling. Presently, other than the FAX CNG signal, a pre-connection frequency range including the 1,100 Hz frequency and available surrounding frequencies remains unused.

SUMMARY OF THE INVENTION

The invention disclosed herein provides a method and a system for providing pre-connection telephony signal exchanges from originating telephony devices. More particularly, the method utilizes a CNG channel, which has a frequency range inclusive of signals of approximately 1,100 Hz, to convey CNG transmissions between an originating telephony device and a telephony network before a connection is established. Unlike previous usages of the CNG channel that conveyed a static, predefined facsimile calling tone (FAX CNG) signal from an originating telephony device, the content of the CNG transmission conveyed through the CNG channel can contain at least one dynamically generated signal including digitally encoded information.

One aspect of the present invention can include a method for conveying digital information including initializing a telephone connection to a receiving device. In one embodiment, the method can receive a connectivity response signal in reply to the initializing step. This connectivity response signal can be a ringback signal indicating that the receiving device is ringing. Prior to establishing a voice channel connection with the receiving device, supplemental data can be digitally encoded into a CNG transmission. The supplemental data can include information other than standardized connectivity information. In one embodiment, the encoding step can further modulate a carrier signal having a frequency of about 1,100 Hz. In another embodiment, the encoding step can include the step of toggling a specific frequency within the CNG channel between an on and an off state. The specific frequency can be approximately 1,100 Hz.

Prior to establishing a voice channel connection with the receiving device, the CNG transmission can be conveyed through a CNG channel, wherein the CNG channel is capable of transporting a FAX CNG signal. In one embodiment, the CNG channel can be within the frequency range of approximately 300–2,400 Hz. In yet another embodiment, the CNG channel can be within the frequency range of approximately 900–1,300 Hz. In a particular embodiment, the receiving device can receive the CNG transmission sent by an originating device via the CNG channel. In a further embodiment, a receiving party, possessing the receiving device, can determine whether to answer the receiving device based upon this CNG transmission. In an alternate embodiment, the supplemental data can specify at least one service requested by the originating device.

BRIEF DESCRIPTION OF THE DRAWINGS

There are shown in the drawings embodiments, which are presently preferred, it being understood, however, that the invention is not limited to the precise arrangements and instrumentalities shown.

DETAILED DESCRIPTION OF THE INVENTION

The invention disclosed herein provides a method and a system for providing pre-connection telephony CNG transmissions from originating telephony devices. An originating telephony device can convey a dynamically generated CNG transmission containing digitally encoded supplemental data to a telephony network. This supplemental data can include information other than the required standardized connectivity information. The CNG transmission can be conveyed along a CNG channel, which is the frequency range available to an originating device before a connection is established through which a facsimile calling tone (FAX CNG) signal is relayed.

Figure 1:
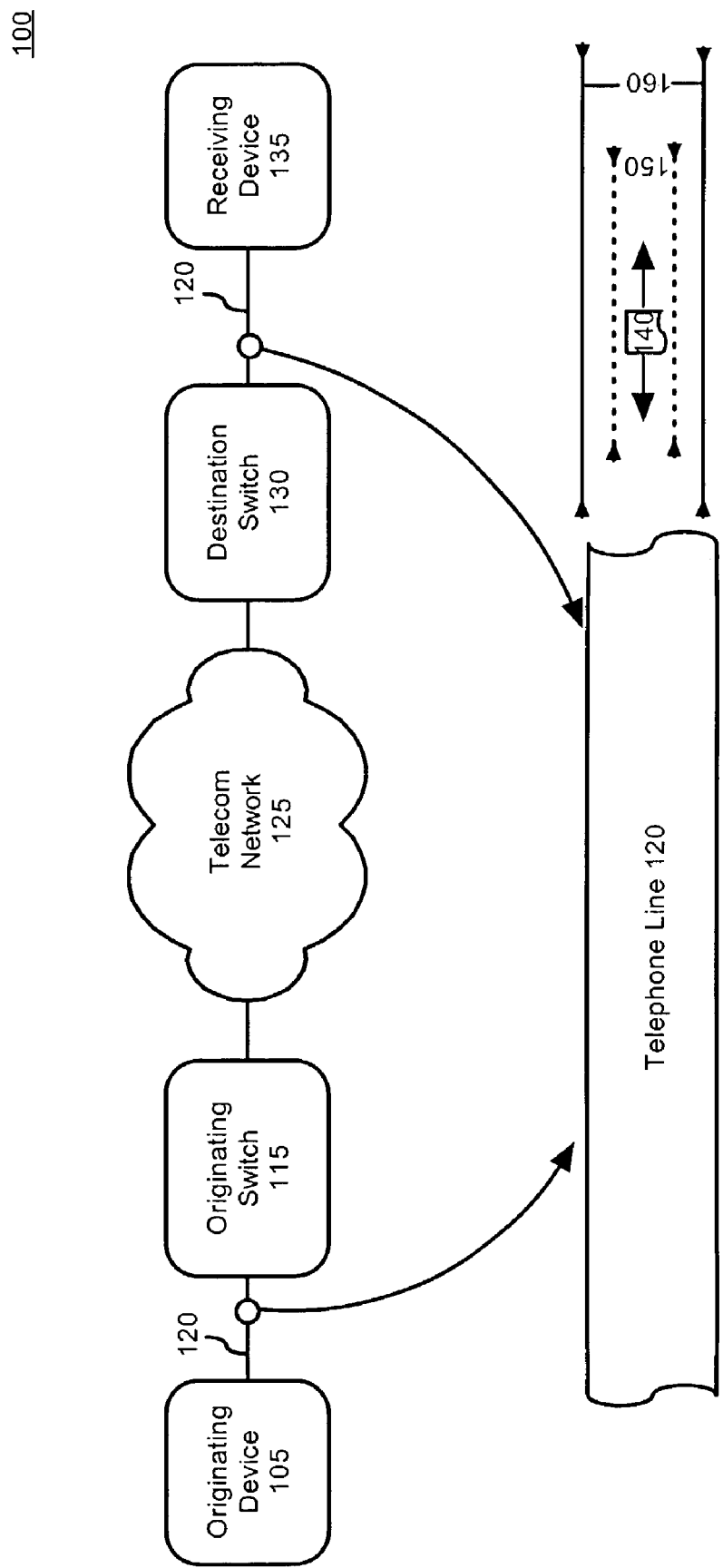
FIG. 1 is a schematic diagram illustrating an exemplary telephony system utilizing pre-connection signal exchanges in accordance with the inventive arrangements disclosed herein.

FIG. 1 is a schematic diagram illustrating a telephony system 100 configured to provide pre-connection signal exchanges in accordance with the inventive arrangements disclosed herein. The system 100 can include a telephone line 120, an originating device 105, a receiving device 135, a telecom network 125, as well as an originating switch 115 and a destination switch 130. In the event that the originating device 105 and the receiving device 135 are connected to the telephony network 125 at a common point, then the originating switch 115 and the destination switch 130 can be a single switch.

The telephone line 120 can be a line that connects a telephony device (customer premise equipment) to the telecom network 125. Physically, the telephone line 120 can include, but is not limited to, a medium, such as a twisted pair, a coaxial cable, and a fiber optic line. The telephone line 120 can conduct signals within a voice band 160 having a frequency range between approximately 0 and 3,400 Hz where human speech generally occurs. It should be noted that frequencies between approximately 0–300 Hz can be unavailable due to noise filtering that can occur within the telecom network 125. Ordinary telephone service is often restricted to the voice band 160, while other services, such as a digital subscriber line (DSL) services, can utilize a broader frequency range.

A CNG channel 150 can include a frequency range within the voice band 160 through which at least one CNG transmission 140 can be transmitted. While the CNG channel 150 is always capable of transporting a pre-connection FAX CNG signal, the exact frequency range available within the CNG channel 150 can vary according to frequency filters placed around the 1,100 Hz range. For example, in one embodiment, frequencies below about 300 Hz and above about 2,400 Hz can be filtered by a telephony company. The resulting CNG channel 150 can include the frequency range from approximately 300 Hz to 2,400 Hz. In another embodiment, all frequencies that deviate from the 1,100 Hz frequency (used by the FAX CNG signal according to T.30 protocol) by more than 200 Hz are filtered. Accordingly, the CNG channel can include a frequency range of approximately 900 Hz to 1,300 Hz.

The CNG transmission 140 can contain a digitally encoded message sent from a telephony device. The CNG transmission 140 can convey information before a connection or loop is established between the originating device 105 and the receiving device 135. For example, the CNG transmission 140 can contain information provided by the originating device 105 that can be used by a receiving party to determine whether to answer the receiving device 135. In one such embodiment, the CNG transmission 140 can contain an authorization key sent by the originating device 105 that is required by the receiving device 135 before permission to establish a connection is granted. In another embodiment, the CNG transmission 140 can include a textual message sent from the originating device 105 which details the subject matter of the requested conversation. In another embodiment, the CNG transmission 140 can contain a description of a service requested by the originating device. For example, the CNG transmission 140 can detail capabilities of the originating device 105 and request that the receiving device 135 be adjusted so that communication can occur at the highest possible level.

The presented examples are not intended to limit the invention, but rather to detail exemplary embodiments of the invention. It should be appreciated that any digitally encoded information, regardless of content can be contained within the CNG transmission 140. Practical considerations, such as available bandwidth and transmission time, can limit the amount of information conveyed within the CNG transmission 140.

Numerous data encoding techniques can be used to place information within the CNG transmission 140. For example, in one embodiment, a specific frequency within the CNG channel 150, such as the 1,100 Hz frequency, can be intermittently turned on and off, where an "on state" can represent a digital one, and an "off state" can represent a digital zero, or vice versa. In other embodiments, a modulation technique can be utilized to encode data within the CNG transmission 140. Modulation techniques can utilize a carrier wave centered around a base frequency where some characteristics of the carrier wave are modified to convey data. Since the CNG transmission 140 can be relayed through the CNG channel 150, the frequency range for the carrier wave used within a modulation technique can be restricted to CNG channel 150 frequencies. Since the CNG channel 150 will often be centered around 1,100 Hz, the base frequency for the carrier wave can be approximately 1,100 Hz. Modulation techniques utilized to encode data can include, but are not limited to, frequency key shifting and phase key shifting. One of ordinary skill in the art can appreciate that regardless of which encoding method is utilized, keeping the CNG channel 150 as narrow as possible will allow other signals to be transmitted within the voice band with minimal interference.

While the digital transmission 140 can be transported between the originating device 105 and the receiving device 135, an end-to-end transmission need not occur. For example, in one embodiment, the digital transmission 140 can originate from the destination switch 130 and be conveyed through the CNG channel 150 to one or more telephony devices, such as devices 105 and 135. In another embodiment, the originating device 105 can transmit the CNG transmission 140 intended for the destination switch 130 and not for the receiving device 135. For instance, a call blocking feature can be implemented within the destination switch 130 that requires an authorization key from the originating device 105 before a connection attempt with the receiving device 135 is permitted. Hence, the CNG transmission 140 can be transmitted before the receiving device 135 rings and before a ringback signal is sent to the originating device 105.

In operation, the originating device 105 can convey the CNG transmission 140 through the CNG channel 150 to an originating switch 115. The originating switch 115 can be a telephony switch that connects the originating device 115 to a telecom network 125. The CNG transmission 140 can then be transported through the telecom network 125 to a destination switch 130 that connects the specified receiving device 135 to the telephony network 125. The destination switch 130 can then transmit the CNG transmission 140 across the CNG channel 150 to the receiving device 135.

One of ordinary skill in the art can appreciate that both the originating device 105 and the receiving device 135 can be connected to a telephony network 125 through the same switch. In such a situation, the originating switch 115 and the destination switch 130 can be the same switch. Accordingly, the CNG transmission 140 can be sent straight from the originating device 105 to the switch and from the switch to the receiving device 135.

Figure 2:
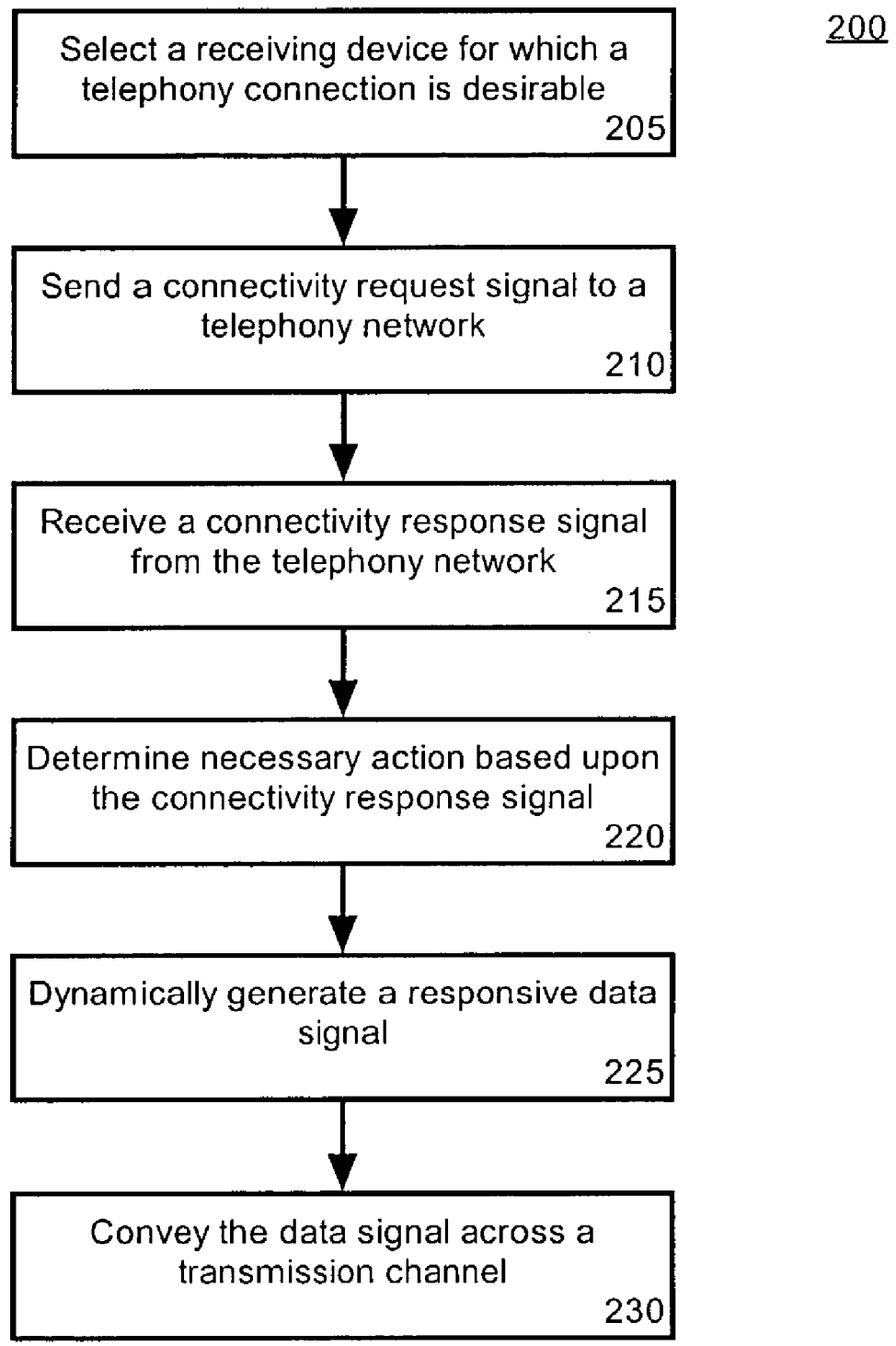
FIG. 2 is a flow chart illustrating a data signal exchange utilizing the system of FIG. 1.

FIG. 2 is a flow chart illustrating a method 200 for exchanging data signals utilizing the system of FIG. 1. The method 200 can be performed in the context of pre-connection telephony signaling from an originating device (calling telephone). The method 200 can begin in step 205 where an originating party can select a receiving device for which a telephony connection is desired. Typically, this selection process includes selecting a telephone number associated with a particular receiving party. In step 210, the selected number can be dialed thereby initiating or sending a connectivity request signal to a telephony network from the originating device. For example, the connectivity request can be sent to an originating switch through the telecom network to a destination switch.

In one embodiment, this destination switch can contain receiving device specific connectivity rules which it can access responsive to the connectivity request. Using such rules, the destination switch can construct a dynamic connectivity response signal. Accordingly, the connectivity response signal can include, but is not limited to, a ringback signal (indicating that the receiving device is ringing), a busy signal, or a signal conveying some other data, such as a digital message. In one embodiment, the connectivity response signal can contain digital information concerning the capabilities of the receiving device. In another embodiment, the connectivity response signal can contain a name and telephone number associated with the receiving device, thusly being a "reverse" caller ID signal. Regardless of the content within the connectivity response signal, in step 215, the originating device can receive the connectivity response signal from the telephony network.

In step 220, the originating device can determine a necessary action based upon the connectivity response signal. For example, if the connectivity response signal requests an authentication key, the necessary action may be to generate such a key. In another example, if the connectivity response signal specifies receiving device capabilities, the originating device may adjust itself to maximize communication between the two telephony devices. Once the necessary action has been determined, the method can proceed to step 225, where a CNG transmission can be responsively generated. The CNG transmission can be generated by digitally encoding data using the encoding and/or modulation mechanisms noted previously. In step 230, the method can convey this CNG transmission across a CNG channel.

Notably, the conveyance of the CNG transmission, as well as all previously mentioned steps, can occur before a voice connection is established between the originating and receiving devices. Additionally, the CNG transmission can contain the same digitally encoded information fully described in FIG. 1. Similarly, the CNG channel across which the CNG transmission is conveyed can be the previously detailed frequency range within the voice band.

In particular embodiments, not all steps specified within the method 200 are necessary. For example, in one embodiment, the originating device can transmit a CNG transmission across the CNG channel to the telephony network at or about the time the connectivity request signal is sent. In such an embodiment, steps 215 and 220 can be optional as the CNG transmission need not be sent in response to a connectivity response signal. Additionally, although in step 225 the CNG transmission is dynamically generated, it need not be. In one particular embodiment, for example, a CNG transmission can contain static signals including analog audio signals, such as pre-recorded voice responses or other digitally encoded information.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for conveying digital information comprising the steps of:
    initiating a telephone connection between an originating device and a receiving device;
    prior to establishing a voice channel connection with said receiving device, digitally encoding supplemental data into a CNG transmission;
    prior to establishing a voice channel connection with said receiving device, conveying said CNG transmission via a CNG channel, wherein said CNG channel is capable of transporting a facsimile calling tone signal.

2. The method of claim 1, further comprising the step of receiving a connectivity response transmission prior to said encoding step, wherein said conveying step is responsive to said initiating step.

3. The method of claim 2, wherein said connectivity response transmission is a ringback signal indicating that said receiving device is ringing.

4. The method of claim 2, wherein said receiving device receives said CNG transmission.

5. The method of claim 1, wherein a receiving party determines whether to answer said receiving device based upon said CNG transmission.

6. The method of claim 1, wherein said supplemental data specifies at least one service requested by said originating device.

7. The method of claim 1, said encoding step further comprising modulating a carrier signal having a frequency of about 1,100 Hz.

8. The method of claim 1, said encoding step further comprising the step of toggling a specified frequency within said CNG channel between an on and an off state.

9. The method of claim 8, wherein said specified frequency is about 1,100 Hz.

10. The method of claim 1, wherein said CNG channel is within the frequency range of 300–2,400 Hz.

11. The method of claim 1, wherein said CNG channel is within the frequency range of 900–1,300 Hz.

12. A computer readable medium storing a computer program having a plurality of code sections, said code sections executable by a computer for causing the computer to perform the steps of:

initiating a telephone connection between an originating device and a receiving device;

prior to establishing a voice channel connection with said receiving device, digitally encoding supplemental data into a CNG transmission;

prior to establishing a voice channel connection with said receiving device, conveying said CNG transmission via a CNG channel, wherein said CNG channel is capable of transporting a facsimile calling tone signal.

13. The computer readable medium of claim 12, further comprising the step of receiving a connectivity response transmission prior to said encoding step, wherein said conveying step is responsive to said initiating step.

14. The computer readable medium of claim 13, wherein said connectivity response transmission is a ringback signal indicating that said receiving device is ringing.

15. The computer readable medium of claim 13, wherein said receiving device receives said CNG transmission.

16. The computer readable medium of claim 12, wherein a receiving party determines whether to answer said receiving device based upon said CNG transmission.

17. The computer readable medium of claim 12, wherein said supplemental data specifies at least one service requested by said originating device.

18. The computer readable medium of claim 12, said encoding step further comprising modulating a carrier signal having a frequency of about 1,100 Hz.

19. The computer readable medium of claim 12, said encoding step further comprising the step of toggling a specified frequency within said CNG channel between an on and an off state.

20. The computer readable medium of claim 19, wherein said specified frequency is about 1,100 Hz.

21. The computer readable medium of claim 12, wherein said CNG channel is within the frequency range of 300–2,400 Hz.

22. The computer readable medium of claim 12, wherein said CNG channel is within the frequency range of 900–1,300 Hz.

* * * * *